(No Model.) 2 Sheets—Sheet 1.

W. TRUXAL.
Bee Hive.

No. 230,448. Patented July 27, 1880.

Attest:
H. R. Penne,
A. M. Long.

Inventor:
Wm. Truxal,
By H. S. Abbot,
Atty.

(No Model.) 2 Sheets—Sheet 2.
W. TRUXAL.
Bee Hive.
No. 230,448. Patented July 27, 1880.
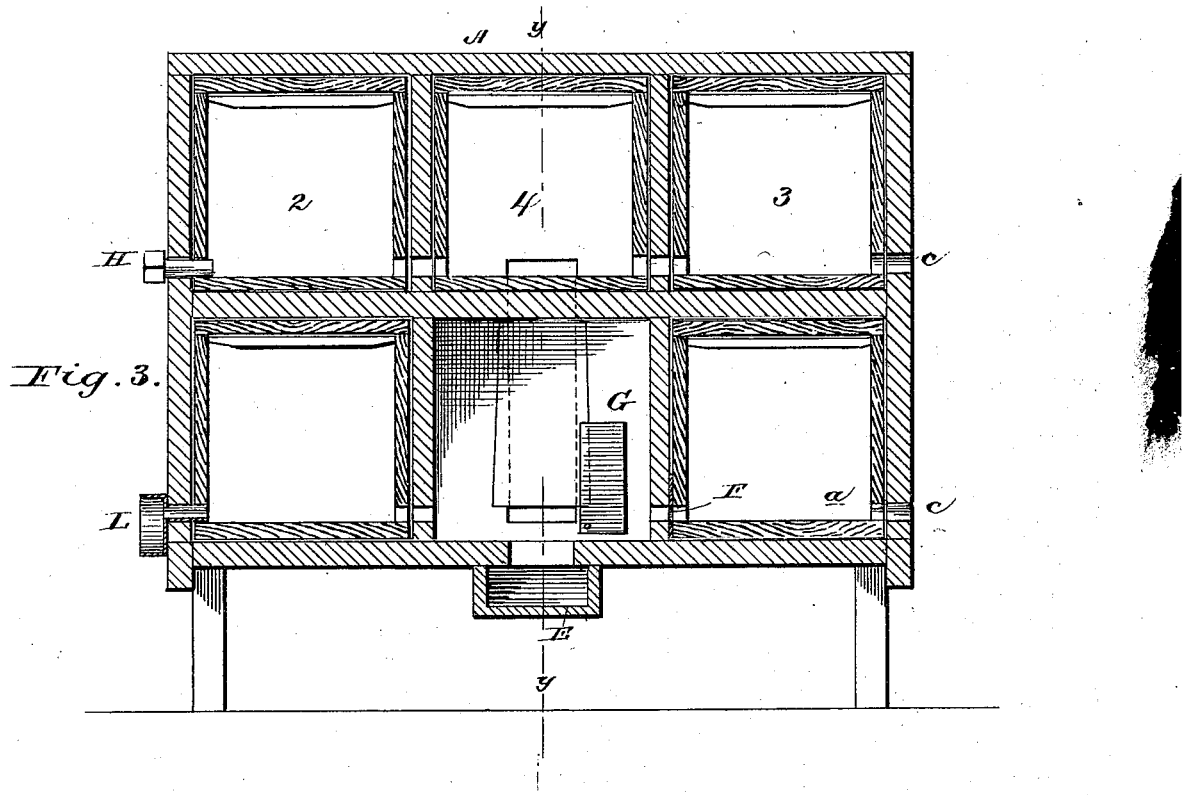
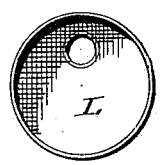
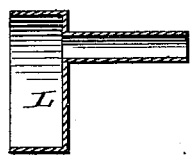
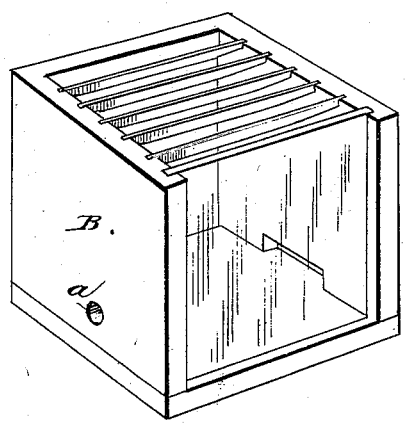
Attest:
H. L. Perrine
A. M. Long
Inventor
Wm Truxal.
By H. J. Abbot
Atty.

UNITED STATES PATENT OFFICE.

WILLIAM TRUXAL, OF BUTLER, PENNSYLVANIA, ASSIGNOR OF ONE-HALF OF HIS RIGHT TO WILLIAM CROMM, OF SAME PLACE.

BEE-HIVE.

SPECIFICATION forming part of Letters Patent No. 230,448, dated July 27, 1880.

Application filed May 10, 1880. (No model.)

*To all whom it may concern:*

Be it known that I, WM. TRUXAL, citizen of United States, residing at Butler, in the county of Butler and State of Pennsylvania, have invented certain new and useful Improvements in Bee-Hives; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification, in which—

Figure 1:
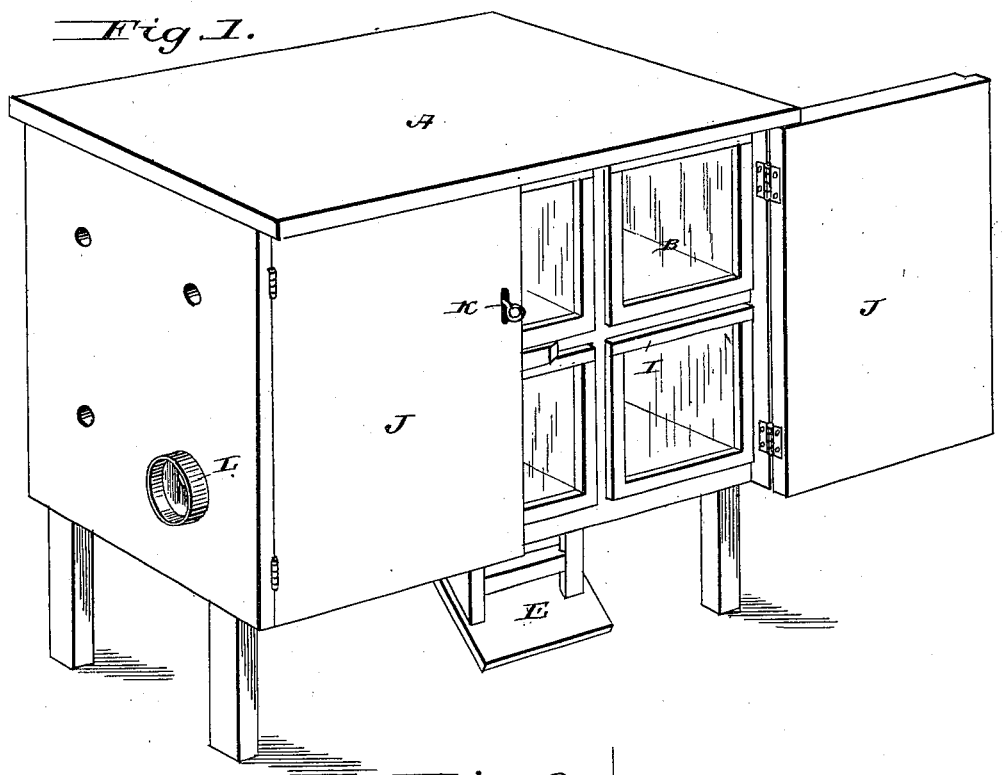
Figure 2:
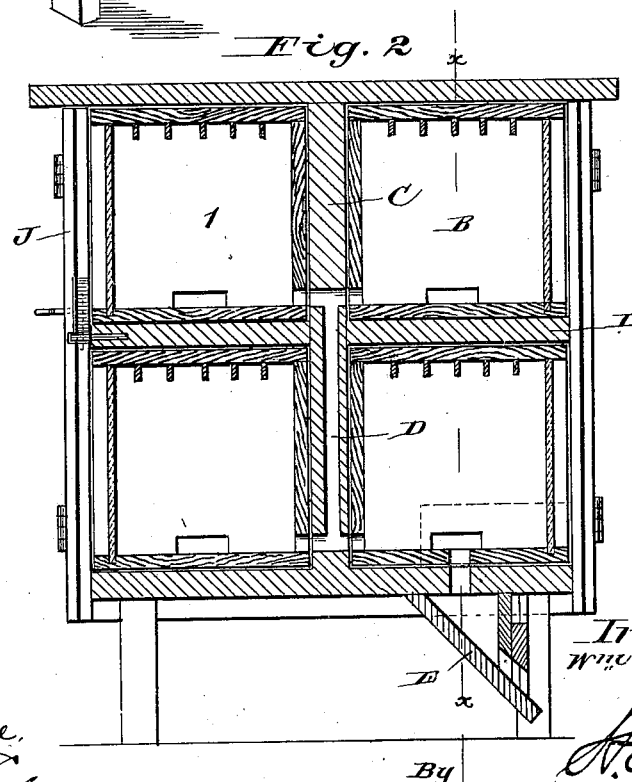

Figure 1 is a perspective with one door open; Fig. 2, a cross-section on the line $y\ y$ of Fig. 3; Fig. 3, a vertical longitudinal section on the line $x\ x$ of Fig. 2; Fig. 4, a perspective of one of the honey-drawers removed from the hive; Fig. 5, an end and a sectional view of the smoking-tube, and Fig. 6 a side view of the plug. Both tube and plug are used for the purposes hereinafter set forth.

My invention relates to bee-hives; and it consists in the construction hereinafter described and pointed out, whereby the bees can be easily transferred from one drawer to another, and any one or more drawers can be readily removed from the hive.

In the accompanying drawing the letter A indicates the box of the hive, within which is placed a series of removable drawers, B, side by side, and one above the other.

The box is divided longitudinally by a vertical partition, C, into two compartments, and in the center of the partition, extending about half-way up the same, there is formed a vertical flue, D, which communicates, by suitable openings at top and bottom, with both compartments either side the partition. In the bottom of the box, near the middle of one of the aforementioned compartments, there is made an opening, beneath and around which is formed a trough or spout, E.

In the accompanying drawings the box is represented as containing twelve drawers, six on each side, or six in a compartment. The number, however, may be increased.

Each drawer is made with the flattened top, as shown in Fig. 4, and each one communicates at the bottom with the next one on its side through a slot made in the side of each, and between each drawer at the lower part there is inserted a perforated or reticulated plate, F, so that passage between each drawer may be cut off by means thereof. The central, bottom, and top drawers communicate one with another through slots made in their lower rear ends and the central flue, D, and the openings described at both ends thereof. The communication of these central drawers with one another and the central flue may be cut off by pivoted reticulated plates G, only one of which is illustrated in the drawing. A hole, $a$, is made in each end drawer, and a corresponding hole, $c$, in the sides of box A, and ordinarily a plug, H, is passed through and keeps closed these holes. At least one side of each drawer is provided with a glass plate, and each is provided with a sliding top, I. Both sides of the box A are provided with double doors J, which are held closed by a catch, K.

In operation the communication between the several drawers, except those communicating directly with the central flue, is cut off, and the bees pass up through spout E into the drawer immediately above it, from whence they pass through the central flue into the drawers communicating directly therewith. After these four drawers are about two-thirds filled with honey the plates G, between drawer 1 and the two drawers, one on either side thereof, are lifted, so as to unclose the opening between the said three drawers, and when those two drawers have become about two-thirds filled the communications between drawers 2 and 3 and 4 are likewise opened, and after they are about two-thirds filled the communications between all the drawers are opened and the bees allowed to work therein. It is well to let honey remain in the drawers all winter, and in the spring—say about the middle of May—if honey is wanted the plugs H are removed and the tubes L inserted in their places, and in a few days the bees will have become accustomed to the tubes and pass in and out through them. The smoke of a paper or other cigar is then blown through the tubes into the drawers, and if the queen is in she will move out of these end drawers into one of the others, when a perforated plate is passed between the openings in two of the drawers, so as to keep the queen in the chamber she has entered and exclude her from the other bees; but at the same time they can both see and hear her through the perforations, and she is prevented from laying any more eggs in the honey contained in the drawers from which she has been excluded.

When the eggs already laid in the drawers vacated by the queen have been hatched the comb or cells will soon be filled with honey. I next withdraw the tubes from several of the end drawers and remove the drawers and substitute empty drawers for them and push in the tubes. The glass spaces of the removed drawers are now taken out, and the bees fly back to the hive and into the same through the tubes which they have been accustomed to pass through. The tubes are then removed and the plugs reinstated, after which the bees pass in and out through the spout E as at first. When the empty drawers have become filled, or nearly so, with honey, an inspection of them is made, and if it is found that eggs have been laid the plugs are removed and the tubes inserted and smoke blown in, as already described, and in a short time every egg will have been hatched and the cells filled with honey, when the tubes are withdrawn and the drawers of new honey moved and the boxes of old honey previously taken out substituted for them. The bees fly back to the hive, and the tubes are removed and plugs inserted, and the hive is still filled with honey for the winter.

The foregoing full description is regarded as sufficient to illustrate the operation of the parts constructed as described, and nothing more will therefore be written.

Some of the plugs H may remain in the box while tubes L are used as described.

Having described my invention, what I claim is—

The box A, provided with central flue, D, and plug H, combined with removable drawers B and perforated plates between the same, as and for the purpose set forth.

In testimony whereof I affix my signature in presence of two witnesses.

WILLIAM TRUXAL.

Witnesses:
   JACOB KECK,
   G. F. KECK.